US012156020B2

(12) United States Patent
Marupaduga

(10) Patent No.: US 12,156,020 B2
(45) Date of Patent: *Nov. 26, 2024

(54) HANDOVER OF WIRELESS DEVICES BASED ON RESOURCE AVAILABILITY

(71) Applicant: T-Mobile Innovations LLC, Overland Park, KS (US)

(72) Inventor: Sreekar Marupaduga, Overland Park, KS (US)

(73) Assignee: Sprint Spectrum LP, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,449

(22) Filed: Nov. 10, 2022

(65) Prior Publication Data

US 2023/0072325 A1 Mar. 9, 2023

Related U.S. Application Data

(63) Continuation of application No. 16/983,391, filed on Aug. 3, 2020, now Pat. No. 11,540,192.

(51) Int. Cl.
*H04W 36/00* (2009.01)
*H04W 36/08* (2009.01)
*H04W 36/24* (2009.01)
*H04W 88/06* (2009.01)
*H04W 88/10* (2009.01)

(52) U.S. Cl.
CPC ..... *H04W 36/24* (2013.01); *H04W 36/00698* (2023.05); *H04W 36/08* (2013.01); *H04W 36/00692* (2023.05); *H04W 88/06* (2013.01); *H04W 88/10* (2013.01)

(58) Field of Classification Search
CPC ..... H04W 36/24; H04W 36/08; H04W 88/06; H04W 88/10; H04W 52/0277; H04W 36/0069
USPC .............................. 370/331; 455/312, 436
See application file for complete search history.

(56) References Cited

U.S. PATENT DOCUMENTS

| 6,408,172 | B1* | 6/2002 | Alperovich | H04M 1/72418 455/404.1 |
|---|---|---|---|---|
| 9,237,501 | B2 | 1/2016 | Kitaji | |
| 11,375,566 | B1* | 6/2022 | Marupaduga | H04W 8/24 |
| 2010/0296483 | A1* | 11/2010 | Sayeedi | H04W 36/0022 370/331 |
| 2014/0023010 | A1* | 1/2014 | Loehr | H04W 52/365 370/329 |

(Continued)

*Primary Examiner* — Marcos Batista
(74) *Attorney, Agent, or Firm* — Jones Robb, PLLC

(57) ABSTRACT

A method of initiating handover of a wireless device includes determining one or more of a low battery condition, a low power headroom, and a high buffer status of a wireless device. The wireless device can be attached to a first access node deploying multiple radio access technologies over a first coverage area. The method further includes identifying a second access node deploying a single radio access technology over a second coverage area encompassing a location of the wireless device, and initiating handover of the wireless device from the first access node to the second access node based at least in part on the one or more of the low battery condition, low power headroom, and high buffer status of the wireless device. Systems and devices relate to initiating handover of a wireless device.

20 Claims, 6 Drawing Sheets

(56) References Cited

U.S. PATENT DOCUMENTS

2015/0071213 A1* 3/2015 Pajukoski ......... H04W 72/1284
370/329
2020/0351792 A1 11/2020 Ghelichi et al.

* cited by examiner

HANDOVER OF WIRELESS DEVICES BASED ON RESOURCE AVAILABILITY

This patent application is a continuation of U.S. patent application Ser. No. 16/983,391, filed on Aug. 3, 2020, which is incorporated by reference in its entirety for all purposes.

TECHNICAL BACKGROUND

As wireless networks evolve and grow, there are ongoing challenges in providing high-quality service to increasing numbers of wireless devices in various coverage areas of a wireless network. Different wireless devices are configured to use different types of applications (such as voice over IP, streaming, gaming, etc.), and each different application may optimally function with a different channel size or bandwidth. Further, radio access technologies (RATs) such as 5G New Radio (NR) are being implemented alongside existing RATs such as 3G and 4G Long Term Evolution (LTE), and wireless devices are increasingly becoming more capable of connecting to these RATs. Further, different RATs can be associated with different types of data transmissions, such as voice, data, streaming, low-latency, high-latency, etc. In other words, different RATs are utilized for applications that require different quality of service (QoS). These different types of network using various RATs and types of data transmissions may be referred to as heterogeneous networks.

In such heterogeneous networks, additional control signaling may be advantageous or required to effectively integrate use of multiple RATs in heterogeneous networks by a wireless device. As a result, additional resources of the network and/or wireless device may be consumed by additional signaling to coordinate use of the RATs. For example, additional resource blocks (e.g., MAC control elements) and/or additional transmission power of the wireless device may be devoted to signaling requirements to facilitate communicating with the multiple RATs. Such increased signaling requirements may have adverse effects on quality of service and overall user experience, particularly in situations in which various resources of the wireless device and/or network are strained.

OVERVIEW

Exemplary embodiments described herein include systems, methods, and nodes for initiating handover of a wireless device based at least in part of resource availability of the wireless device. A method of initiating handover of a wireless device includes determining one or more of a low battery condition, a low power headroom, and a high buffer status of a wireless device. The wireless device can be attached to a first access node deploying multiple radio access technologies over a first coverage area. The method further includes identifying a second access node deploying a single radio access technology over a second coverage area encompassing a location of the wireless device, and initiating handover of the wireless device from the first access node to the second access node based at least in part on the one or more of the low battery condition, low power headroom, and high buffer status of the wireless device.

An exemplary system described herein for initiating handover of a wireless comprises an access node deploying a first radio access technology and a second radio access technology. The system includes a processor configured to determine one or more of a low battery condition, a low power headroom, and a high buffer status of a wireless device attached to the access node, and initiate handover of the wireless device from the first radio access technology to the second radio access technology based at least in part on the one or more of the low battery condition, low power headroom, and high buffer status of the wireless device.

An exemplary processing node described herein for initiating handover of a wireless device is configured to perform operations comprising determining one or more of a low battery condition, a low power headroom, and a high buffer status of a wireless device attached to a first access node deploying multiple radio access technologies over a first coverage area, identifying a second access node deploying a single radio access technology over a second coverage area encompassing a location of the wireless device, and initiating handover of the wireless device from the first access node to the second access node based on at least in part on the one or more of the low battery condition, low power headroom, and high buffer status of the wireless device.

DETAILED DESCRIPTION

Figure 1:
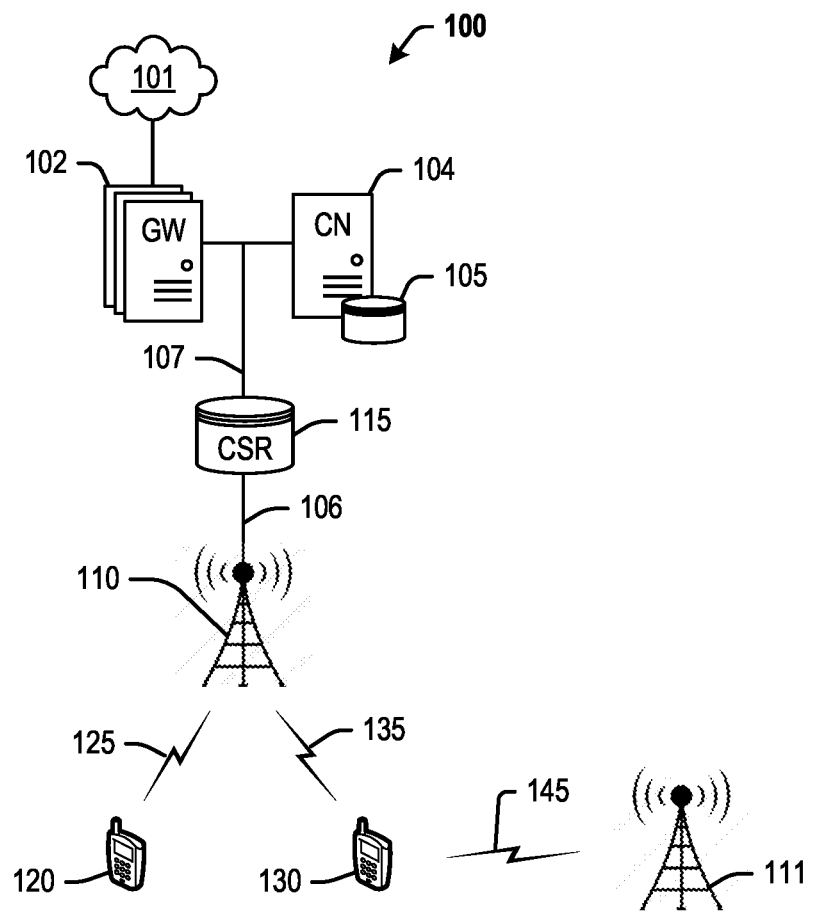
FIG. 1 depicts an exemplary system for initiating handover of a wireless device.

Exemplary embodiments described herein include systems, methods, and processing nodes for initiating handover of a wireless device. In heterogenous networks, such as those with access nodes deploying multiple radio access technologies (RATs), use of the network may necessitate additional signaling requirements between the wireless device and the access node deploying the multiple RATs to facilitate connectivity and communication using the multiple RATs. Such additional signaling requirements can potentially strain resources of the wireless device, especially in situations in which the wireless device has low power headroom, low battery charge level, high buffer status, or other limited resources. In such situations, the resource consumption of the additional signaling requirements can potentially impact the quality of service and the overall user experience of the wireless device.

According to various exemplary embodiments of the disclosure, handover of the wireless device from a first access node deploying multiple RATs to an access node deploying a single RAT can be initiated based on resource availability, such as the determination of a resource-strained condition of the wireless device. Such conditions can include, for example, a low power headroom, a low battery charge level, and/or a high buffer status. Handover from the first access node to the second access node is initiated based on the resource-strained condition of the wireless device and successful identification of the second access node (e.g., the presence and recognition of an access node having a coverage area encompassing the wireless device and deploying a single RAT).

Alternatively, rather than handover of the wireless device from a multiple-RAT access node to a single-RAT access node, e.g., in situations where a single-RAT access node is not within range of the wireless device, according to exemplary embodiments of the disclosure, the wireless device can be handed over from a first use mode, i.e., a multiple-RAT use mode, to a second use mode, i.e., a single-RAT use mode, based on resource-strained conditions of the wireless device. For example, a wireless device may be attached to an access node deploying 4G and 5G RATs, and, upon determination of a resource-strained condition of the wireless device, such as low battery charge level, low power headroom, or high buffer status, the wireless device can be handed over from a use mode in which both the 4G and 5G RATs are used by the wireless device to a use mode in which only a single RAT is used by the wireless device. In some exemplary embodiments, handover from a multiple-RAT use mode to a single-RAT use mode is carried out by reconfiguring the radio resource control (RRC) to limit connection of the wireless device to a single RAT of the access node. Handover from the multiple-RAT operational mode to the single RAT operational mode can help to conserve resources of the wireless device by reducing the need for wireless device resources to be used for signaling and control purposes.

Determination of the available resources of the wireless device, and thus a resource-strained condition of the wireless device, can be made using various reporting schemes of the wireless device and access node, such as, for example, MAC control element (MAC CE) reporting. As noted above, conditions such as low power headroom, low battery charge level, and/or high buffer status can result in initiation of handover from a multiple-RAT access node or operational mode to a single-RAT access node or operational mode. A low power headroom condition can be, for example, a power headroom that satisfies a criterion, such as headroom equaling or falling below a predetermined threshold. A low battery charge level can be, for example, a battery charge level that satisfies a criterion, such as battery charge equaling or falling below a predetermined threshold. A high buffer status can be, for example, a buffer status that satisfies a criterion, such as a buffer status above a predetermined threshold. According to the disclosure, any of these conditions, alone or in combination, can be sufficient to initiate handover as described above.

Handover of the wireless device from a multiple-RAT access node to a single-RAT access node (or, alternatively, from a multiple-RAT mode of operation to a single-RAT mode of operation on the same access node) can result in fewer resources of the wireless device being consumed for signaling and control purposes. As a result, certain aspects of quality of service can potentially be maintained at a higher level as compared to operation using multiple RATs.

FIG. 1 depicts an exemplary system 100 for initiating handover of a wireless device. System 100 comprises a communication network 101, gateway node(s) 102, controller node 104, access node 110, cell site router 115, and wireless devices 120 and 130. In other embodiments, any other combination of cell site routers, access nodes, and wireless devices may be evident to those having ordinary skill in the art in light of this disclosure. In this exemplary embodiment, access node 110 may be a macrocell access node configured to deploy wireless air-interfaces 125, 135 to which wireless devices 120, 130 can respectively attach. For example, access node 110 can include a combination of a 4G eNodeB and a 5G gNodeB. In other words, the access node 110 can comprise antennae that are configured to communicate using 4G LTE (i.e. a first RAT) as well as antennae that are configured to communicate using 5G NR (a second RAT). Further, the access node 110 can include a plurality of antennae (or antenna elements), a portion of which is configured to deploy a first bandwidth or RAT (e.g. 4G LTE), and a portion of which is configured to deploy a second bandwidth or RAT (e.g. 5G NR). Consequently, wireless devices 120, 130 are respectively capable of attaching to 4G and 5G RATs. Further, cell site router 115 includes any node that is configured to route incoming data packets from network 101 and/or gateway node(s) 102 to access node 110 (and wireless devices 120, 130), and to route outgoing data packets received from the access node 110 (and originating at wireless devices 120, 130) to the gateway node(s) 102 and/or network 101.

Access node 110 can be any network node configured to provide communication between wireless devices 120, 130 and communication network 101, including standard access nodes such as a macro-cell access node, base transceiver station, a radio base station, an eNodeB device, an enhanced eNodeB device, or the like. In an exemplary embodiment, a macro-cell access node 110 can have a coverage area in the range of approximately five kilometers to thirty-five kilometers and an output power in the tens of watts. Further, access node 110 may comprise any short range, low power, small-cell access nodes such as a microcell access node, a picocell access node, a femtocell access node, or a home eNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107.

Wireless device 120 may be any device, system, combination of devices, or other such communication platform capable of communicating wirelessly with access node 110 using one or more frequency bands deployed therefrom. Wireless device 120 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 130. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1, S4, S5, S11, S1-MME, or S1-U communication links. Other wired or wireless protocols can also be used. Communication links 106, 107 can be a direct link or might include various equipment, intermediate components, systems, and networks. Communication links 106, 107 may comprise many different signals sharing the same link.

Gateway node(s) 102 can be any network node configured to interface with other network nodes using various protocols. Gateway node(s) 102 can communicate user data over system 100. Gateway node(s) 102 can be standalone computing devices, computing systems, or network components, and can be accessible, for example, by a wired or wireless connection, or through an indirect connection such as through a computer network or communication network. For example, gateway node(s) 102 can include a serving gateway (S-GW) and/or a public data network gateway (P-GW), etc. One of ordinary skill in the art would recognize that gateway node(s) 102 are not limited to any specific technology architecture, such as Long Term Evolution (LTE) and can be used with any network architecture and/or protocol.

Each of gateway node(s) 102 can comprise a processor and associated circuitry to execute or direct the execution of computer-readable instructions to obtain information. Gateway node(s) 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node(s) 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100. This information may be requested by or shared with cell site router 115, gateway node(s) 102 and/or access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

FIG. 1 further illustrates another access node 111. The access node 111 may have a configuration similar to access node 110, and while not illustrated, may be connected to communication network 101 via a gateway node, controller node, one or more communication links, etc. While access node 110 may be configured to deploy multiple RATs, such as 4G LTE and 5G NR as discussed above, according to exemplary embodiments of the disclosure, access node 111 may be configured to deploy a single radio access technology, such as 4G LTE only. The access node 111 can exhibit a coverage area that encompasses a location of one or both of wireless devices 120 and 130, and can deploy a wireless air-interface 145 to which the wireless devices 120 and/or 130 can attach. The coverage area of the access node 111 can be coextensive with or different from the coverage area of the access node 110.

Hardware and/or software of the system 100 are configured to initiate handover of a wireless device, such as wireless devices 120 or 130, from access node 110, which can be configured to deploy multiple RATs to another, neighboring access node, such as access node 111 deploying a single RAT. Additionally or alternatively, the hardware and/or software of the system 100 can be configured to initiate handover of the wireless device from a multiple-RAT operational mode to a single-RAT operational mode on the same access node, such as access node 110. Such handovers can be based on a wireless device (such as wireless devices 120 or 130) exhibiting a low power headroom, a low battery charge level, a high buffer status, or other characteristics indicative of strained resources of the wireless device.

For example, if the wireless device attached to a multiple-RAT access node (e.g., access node 110) satisfies a criterion indicative of a resource-strained condition, such as the power headroom of the wireless device equaling or falling below a threshold, the battery charge of the wireless device equaling or falling below a threshold, or the buffer status of the wireless device equaling or exceeding a threshold, or any combination of these conditions, the wireless device is handed over to an access node deploying a single RAT. Additionally or alternatively, as discussed above, the wireless device can be handed over from a multiple-RAT operational mode on the first access node to a single-RAT operational mode on the first access node.

Figure 2:
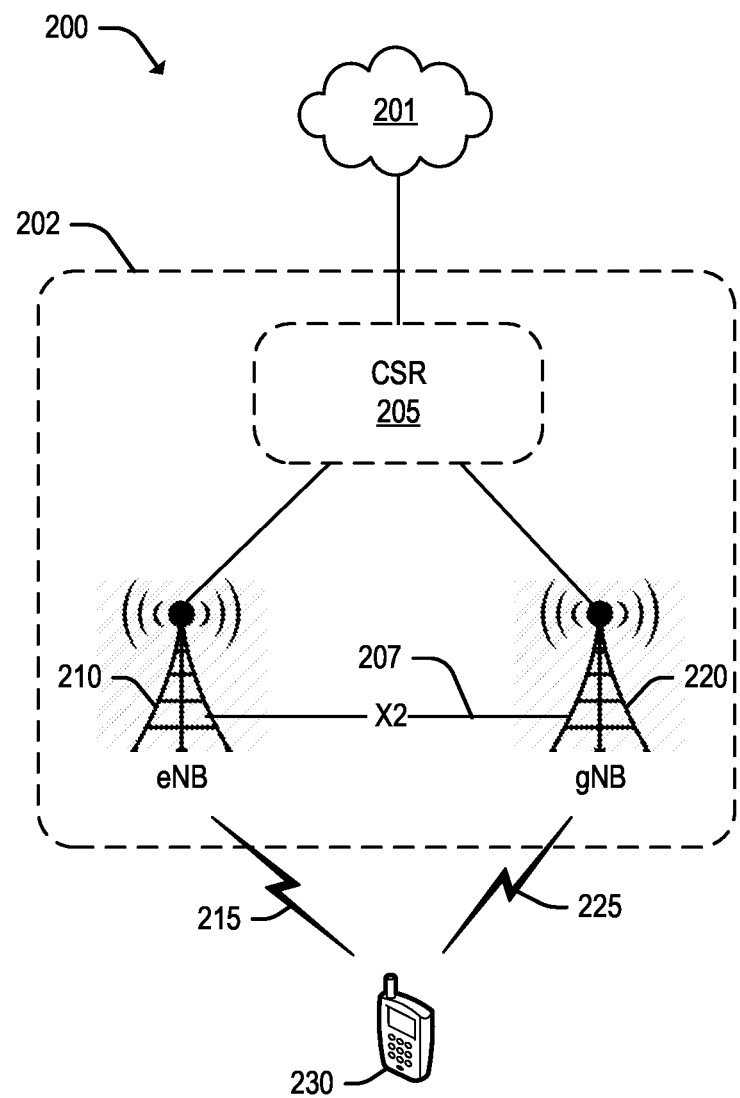
FIG. 2 depicts another exemplary system for initiating handover of a wireless device.

As noted above, exemplary embodiments of the disclosure can be used with systems including multiple RATs. For example, FIG. 2 depicts an exemplary system 200 for E-UTRAN-NR Dual Connectivity (EN-DC) using 4G LTE and 5G NR. System 200 includes a communication network 201, a radio access network 202, and a wireless device 230. Radio access network further includes at least a cell site router 205, and access nodes 210, 220. Cell site router 205 can include any network node that is configured to route incoming data packets from network 201 to wireless device 230 via access node(s) 210, 220, and to route outgoing data packets received from the wireless device 230 via access node(s) 210, 220 to the network 201. Therefore, network 201 can include any combination of networks, including a core network, intermediate/backhaul network, or packet data network (PDN). Persons having ordinary skill in the art may note that although only access nodes 210, 220, cell site router 205, and network 201 are illustrated in FIG. 2, other components such as gateways, controller nodes, user plane functions, etc. may be included as well.

In this exemplary embodiment, access node 210 can include an eNodeB, and access node 220 can include a gNodeB. For example, access node 210 can be configured to deploy a wireless interface 215 using a first radio access technology (RAT), e.g. 4G LTE, and access node 220 can be configured to deploy a second wireless interface 225 using a second RAT, e.g. 5G NR. Each RAT can be configured to utilize a different frequency band or sub-band, a different channel size or bandwidth, and so on. For example, the 5G NR wireless interface 225 can be configured to utilize higher frequencies and larger channel bandwidths than the 4G LTE wireless interface 215. Further, access nodes 210, 220 can be configured to communicate using both RATs at the same time. For example, dual connections can be set up with wireless device 230 using both 4G and 5G air interfaces 215, 225 respectively, the 4G wireless interface 215 being used to transmit control information, and the 5G wireless interface 225 being used to transmit data information. For example, a processing node within system 200 (for example, communicatively coupled to access nodes 210, 220, or any other network node) can be configured to determine whether wireless device 230 is capable of communicating using both RATs, and instruct the access node 210 to broadcast an indicator in, for example, a system information message. Responsive to the indicator, wireless device 230 can attach to access node 210 which can use the 4G carrier to control and set up a dual connectivity session with wireless device 230. In other words, control information (including SIB messages) is transmitted from the access node 210 using the 4G LTE air interface, while the 5G NR air interface is utilized for transmission of data. Using the 5G RAT for data transmissions is advantageous, as 5G provides higher bandwidths and frequencies versus 4G. In addition, while different carriers offer different channel bandwidths, certain combinations of carriers may provide a greater aggregate channel bandwidth. In an exemplary embodiment utilizing multiple input multiple output (MIMO), wireless device 230 can receive a MIMO data stream using the 5G NR wireless interface, with control signaling that enables the MIMO data stream using the 4G wireless interface.

Within radio access network 202, access nodes 210 and 220 can be coupled via a direct communication link 207, which can include an X2 communication link. Access nodes 210 and 220 can communicate control and data information across X2 communication link 207. In an exemplary embodiment, the access node 220 includes logic that determines how to allocate data packets between access nodes 210 and 220.

Figure 3:
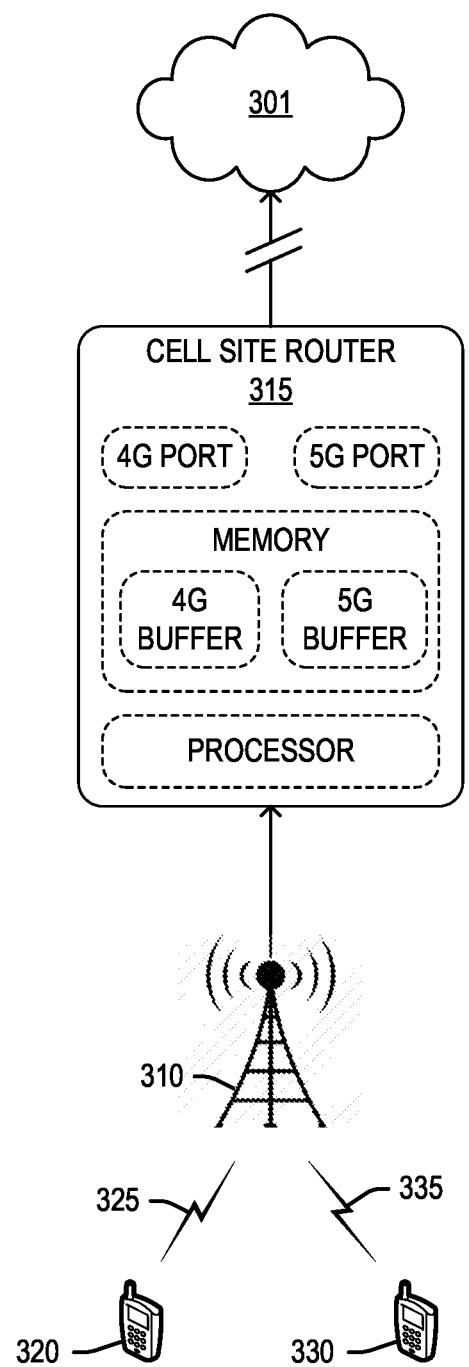
FIG. 3 depicts a schematic of an exemplary cell site router.

FIG. 3 depicts a schematic of an exemplary cell site router. Similar to system 100, cell site router 315 is illustrated as being coupled to an access node 310, and capable of communicating with core network 301 (which can include gateway nodes, controller nodes, and other interfaces to an external network). Cell site router 315 can include any node that is configured to route data packets between core network 302 and access node 310 via one or more ports. In addition to a processor and a memory, cell site router 315 is illustrated as having 4G ports and 5G ports which are used to transport data packets that are associated with 4G and/or 5G RATs. In addition, the memory stores at least a 4G buffer and a 5G buffer, respectively associated with the 4G port and the 5G port. The cell site router 315 can be configured to receive a data transmission from the access node 310 and forward the data transmission to the destination node (via the network 301 and/or any intervening gateway nodes). In other words, the data transmission may be an uplink data transmission.

The uplink data transmission traverses a buffer of the cell site router 315 that is associated with a RAT that the data transmission utilizes, such as 3G, 4G, 5G, TDD, FDD, etc. Thus, the cell site router 315 may include a plurality of ports as shown herein, each associated with a different radio access technology. For example, data transmissions using 4G are transmitted via a 4G port of the cell site router 315, data transmissions using 5G are transmitted via a 5G port of the cell site router 315, and so on. As used herein, the term "high buffer status" can be indicative of a condition in which buffers (e.g., the 4G and/or 5G buffers) are nearly full or at capacity.

Figure 4:
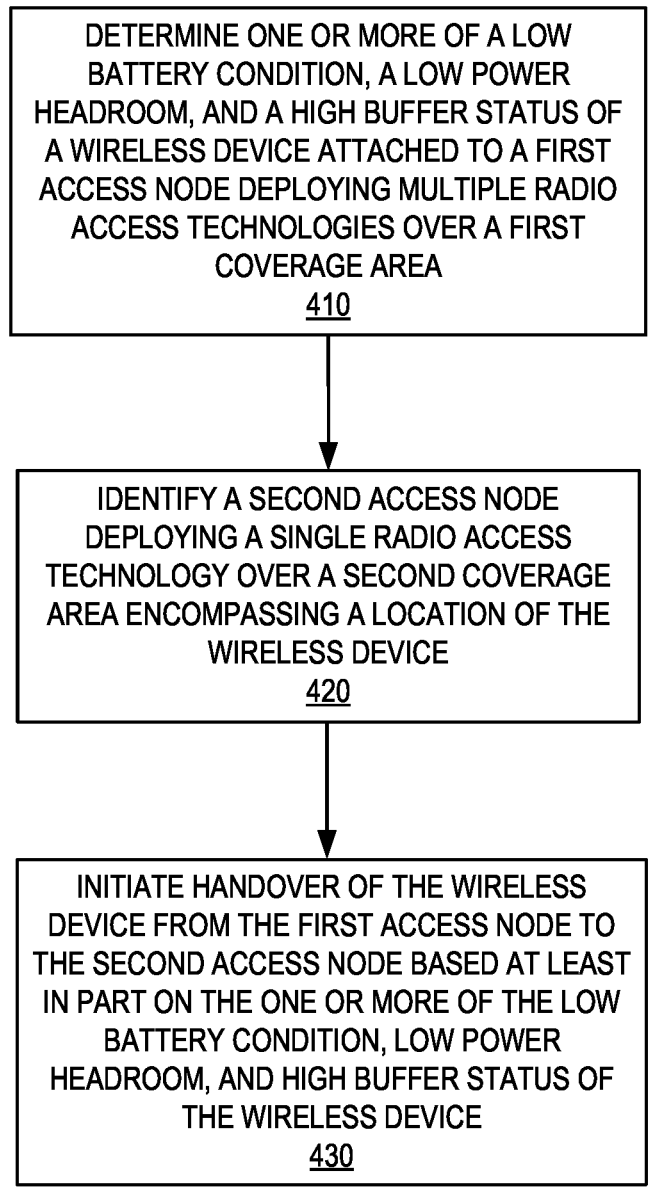
FIG. 4 depicts an exemplary method for initiating handover of a wireless device.

FIG. 4 depicts an exemplary method for initiating handover of a wireless device. Although FIG. 4 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 410, the method includes determining one or more of a low battery condition, a low power headroom, and a high buffer status of a wireless device. The wireless device can be attached to a first access node deploying multiple RATs, such as a combination of 4G LTE and 5G NR as discussed in connection with FIG. 2. The first access node can exhibit a first coverage area. The battery condition, power headroom, and buffer status of the wireless device can be determined based on battery condition, power headroom, and buffer status as reported, e.g., by MAC control elements. The determining of the low battery condition, low power headroom, and high buffer status can be based, for example, on the battery charge level, power headroom, and buffer status satisfying or failing to satisfy various criteria. For example, a low battery condition can include a battery charge equal to or below a predetermined threshold, a low power headroom can include a power headroom equal to or below a predetermined threshold, and a high buffer status can include a buffer status equal to or above a predetermined threshold.

At 420, a second access node deploying a single RAT is identified. The second access node can exhibit a second coverage area coextensive with or different from the first coverage area and encompassing the wireless device. In exemplary embodiments of the disclosure, the single RAT is 4G LTE, but in other exemplary embodiments the single RAT can include a RAT other than 4G LTE.

At 430, based on the determination at 410 of the one or more of the low battery condition, low power headroom, and high buffer status of the wireless device, handover of the wireless device from the first access node to the second access node is initiated. Accordingly, the wireless device transitions from use of the multiple-RAT connectivity the first access node to the single-RAT connectivity of the second access node. As non-limiting examples, the multiple-RAT connectivity can include an operational mode using a combination of 4G LTE and 5G NR RATs, such as that described in connection with FIG. 2, and the single-RAT connectivity can be a 4G LTE operational mode. Handover from the first access node to the second access node, and the associated change from the multiple-RAT operational mode to the single-RAT operational mode, can lessen the signaling requirements on the wireless device and provide an overall improved user experience given the available resources of the wireless device.

Figure 5:
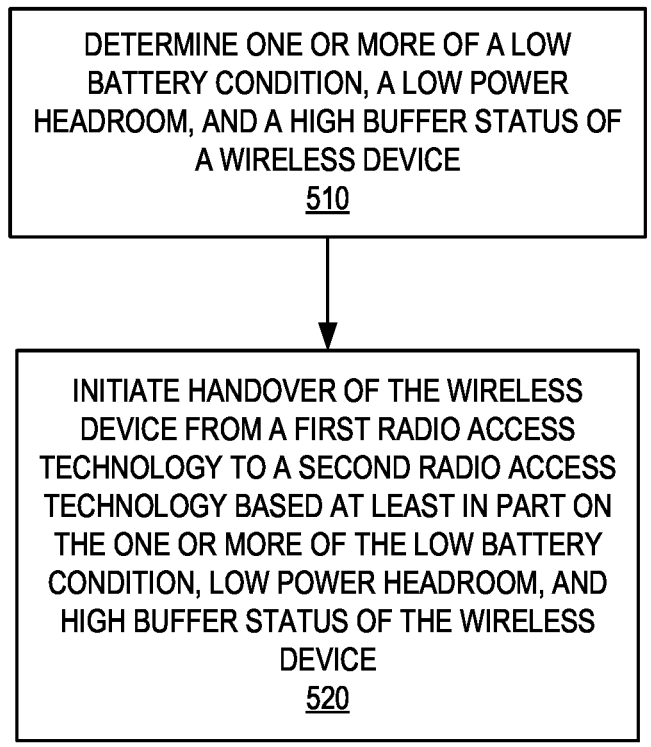
FIG. 5 depicts another exemplary method for initiating handover of a wireless device.

FIG. 5 depicts an exemplary method for initiating handover of a wireless device. Although FIG. 5 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 510, the method includes determining one or more of a low battery condition, a low power headroom, and a high buffer status of a wireless device. The wireless device can be attached to a first access node using a multiple-RAT operational mode, such as a combination of 4G LTE and 5G NR as discussed in connection with FIG. 2, and the first access node can exhibit a first coverage area. The battery condition, power headroom, and buffer status of the wireless device can be determined based on battery condition, power headroom, and buffer status as reported, e.g., by MAC control elements. The determining of the low battery condition, low power headroom, and high buffer status can be based, for example, on the battery charge level, power headroom, and buffer status satisfying or failing to satisfy various criteria. For example, a low battery condition can include a battery charge equal to or below a predetermined threshold, a low power headroom can include a power headroom equal to or below a predetermined threshold, and a high buffer status can include a buffer status equal to or above a predetermined threshold.

At 520, based on the determination at 510 of the one or more of low battery condition, low power headroom, and high buffer status of the wireless device, handover of the wireless device from a first radio access technology to a second radio access technology is initiated. As non-limiting examples, the first radio access technology can comprise a multiple-RAT operational mode, such as the combination 4G LTE and 5G NR operational mode described in connection with FIG. 2. The second radio access technology can be, for example, a single-RAT operational mode such as 4G LTE. As one example, handover of the wireless device from a multiple-RAT operational mode to a single-RAT operational mode can include reconfiguring a radio resource control (RCC) that controls communication between the wireless device and the access node from the multiple-RAT operational mode to the single-RAT operational mode. Handover from the first radio access technology to the second radio access technology can lessen the signaling requirements on the wireless device and provide an overall improved user experience given the available resources of the wireless device Further, the methods, systems, devices, networks, access nodes, and equipment described herein may be implemented with, contain, or be executed by one or more computer systems and/or processing nodes. The methods described herein may also be stored on a non-transitory computer readable medium. Many of the elements of system 100 may be, comprise, or include computers systems and/or processing nodes. This includes, but is not limited to: cell site router 115, gateway node(s) 102, controller node 104, access node 110, and/or network 101.

Figure 6:
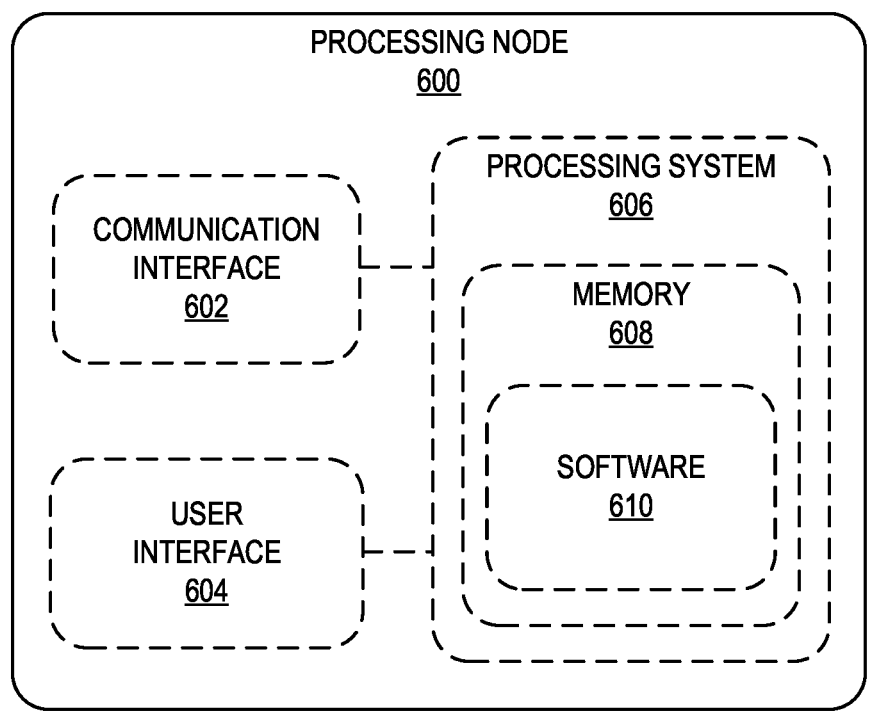
FIG. 6 depicts an exemplary processing node for initiating handover of a wireless device.

FIG. 6 depicts an exemplary processing node for scheduling resources for relay access nodes in a wireless network. Processing node 600 comprises a communication interface 602, user interface 604, and processing system 606 in communication with communication interface 602 and user interface 604. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. For example, storage 608 may include a buffer. Software 610 may include computer programs, firmware, or some other form of machine-readable instructions, including an operating system, utilities, drivers, network interfaces, applications, or some other type of software. For example, software 610 may include a module for performing handover operations described herein. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system for initiating handover of a wireless device, the system comprising:
    an access node deploying a first radio access technology and a second radio access technology; and
    a processor configured to:
    determine one or more of a low battery condition, a low power headroom, and a high buffer status of a wireless device attached to the access node; and
    initiate handover of the wireless device from the first radio access technology to the second radio access technology based at least in part on the one or more of the low battery condition, low power headroom, and high buffer status of the wireless device.

2. The system of claim 1, wherein initiating handover of the wireless device from the first radio access technology to the second radio access technology comprises reconfiguring a radio resource control that controls communication between the wireless device and the access node.

3. The system of claim 2, wherein initiating handover of the wireless device from the first radio access technology to the second radio access technology comprises initiating handover of the wireless device from a multiple-radio access technology use mode to a single-radio access technology use mode.

4. The system of claim 1, wherein the first radio access technology comprises a combination of 4G and 5G radio access technologies.

5. The system of claim 1, wherein the second radio access technology comprises a 4G radio access technology.

6. The system of claim 1, wherein the low battery condition comprises a battery charge level equal to or below a predetermined threshold.

7. The system of claim 1, wherein the low power headroom comprises a power headroom equal to or below a predetermined threshold.

8. The system of claim 1, wherein the high buffer status comprises a buffer status equal to or above a predetermined threshold.

9. A method of initiating handover of a wireless device, the method comprising:
    determining one or more of a low battery condition, a low power headroom, and a high buffer status of a wireless device attached to an access node using a multiple-radio access technology use mode; and
    initiating handover of the wireless device at the access node from the multiple-radio access technology use mode to a single-radio access technology use mode based at least in part on the one or more of the low battery condition, low power headroom, and high buffer status of the wireless device.

10. The method of claim 9, wherein initiating handover of the wireless device from the multiple-radio access technology use mode to the single-radio access technology use mode comprises reconfiguring a radio resource control that controls communication between the wireless device and the access node.

11. The method of claim 9, wherein the low battery condition comprises a battery charge level equal to or below a predetermined threshold.

12. The method of claim 9, wherein the low power headroom comprises a power headroom equal to or below a predetermined threshold.

13. The method of claim 9, wherein the high buffer status comprises a buffer status equal to or above a predetermined threshold.

14. The method of claim 9, wherein the multiple-radio access technologies comprise 4G and 5G radio access technologies.

15. The method of claim 9, wherein the single-radio access technology comprises a 4G radio access technology.

16. A processing node for initiating handover of a wireless device, the processing node being configured to perform operations comprising:
    determining one or more of a low battery condition, a low power headroom, and a high buffer status of a wireless device attached to an access node using a first radio access technology; and
    initiating handover of the wireless device at the access node from the first radio access technology to a second radio access technology based at least in part on the one or more of the low battery condition, low power headroom, and high buffer status of the wireless device.

17. The processing node of claim 16, wherein initiating handover of the wireless device from the first radio access technology to the second radio access technology comprises reconfiguring a radio resource control that controls communication between the wireless device and the access node.

18. The processing node of claim 17, wherein initiating handover of the wireless device from the first radio access technology to the second radio access technology comprises initiating handover of the wireless device from a multiple-radio access technology use mode to a single-radio access technology use mode.

19. The processing node of claim 16, wherein the first radio access technology comprises a first signaling resource requirement.

20. The processing node of claim 19, wherein the second radio access technology comprises a second signaling resource requirement that is less than the first signaling resource requirement.

* * * * *